United States Patent
Mercier

(10) Patent No.: US 12,247,678 B2
(45) Date of Patent: Mar. 11, 2025

(54) METHOD OF PROVIDING A PIPE PASSAGEWAY THROUGH A CONCRETE SLAB

(71) Applicant: John K. Mercier, Cuddy, PA (US)

(72) Inventor: John K. Mercier, Cuddy, PA (US)

( * ) Notice: Subject to any disclaimer, the term of this patent is extended or adjusted under 35 U.S.C. 154(b) by 831 days.

(21) Appl. No.: 17/200,779

(22) Filed: Mar. 13, 2021

(65) Prior Publication Data
US 2022/0290781 A1 Sep. 15, 2022

(51) Int. Cl.
*F16L 27/00* (2006.01)
*E03D 11/16* (2006.01)
*E03F 5/04* (2006.01)
*F16L 1/028* (2006.01)

(52) U.S. Cl.
CPC .............. *F16L 1/028* (2013.01); *E03D 11/16* (2013.01); *E03F 5/0407* (2013.01)

(58) Field of Classification Search
CPC ... E03C 1/12; F16L 27/00; F16L 47/18; F16L 1/028; F16L 5/12; F16L 25/14; E03F 5/041; E03F 5/0407; E03F 2005/0416; Y10T 29/49826; E03D 11/16
See application file for complete search history.

(56) References Cited

U.S. PATENT DOCUMENTS

| | | | | |
|---|---|---|---|---|
| 278,723 A | * | 6/1883 | Monteath | F16L 25/14 137/247.27 |
| 443,680 A | * | 12/1890 | Johnson | F16L 25/14 137/247.27 |
| 662,114 A | * | 11/1900 | Cory | F23J 15/022 110/162 |
| 1,328,262 A | * | 1/1920 | Boosey | E03F 5/0407 210/539 |
| 1,793,681 A | | 2/1931 | Crowell | |
| 1,804,979 A | | 5/1931 | Haas | |
| 2,295,416 A | * | 9/1942 | Madison | E03C 1/122 4/252.5 |
| 2,497,577 A | * | 2/1950 | Biggerstaff | E03F 5/0407 210/164 |
| 2,743,786 A | * | 5/1956 | Boosey | E03F 5/0409 285/201 |
| 3,104,777 A | * | 9/1963 | Pottash | B65D 90/105 220/86.1 |

(Continued)

*Primary Examiner* — Edwin J Toledo-Duran
(74) *Attorney, Agent, or Firm* — Carothers and Carothers

(57) ABSTRACT

A method of providing a drain pipe passageway through a concrete slab wherein a plastic pipe of predetermined diameter, which is greater than the underlying drain pipe, is positioned in an upright manner within a location of a concrete slab to be poured. Concrete is poured around the pipe to a desired level leaving a portion of the pipe exposed above this level, and the concrete is permitted to solidify. Thereafter the exposed portion of the pipe is cut off leaving an upper opening of the pipe flush with the upper surface of the concrete slab. The upper opening of the pipe is closed off with a plastic cap and a passageway of predetermined diameter, which is smaller than the pipe diameter, is drilled through the cap at a newly calculated position of alignment, and a plastic pipe having an outside diameter which will mate with this smaller diameter of the passageway is inserted through the cap passageway and cemented in position.

9 Claims, 4 Drawing Sheets

(56) References Cited

U.S. PATENT DOCUMENTS

| | | | | |
|---|---|---|---|---|
| 3,419,288 A * | 12/1968 | Logsdon | ................ | E03D 11/16 |
| | | | | 285/137.11 |
| 4,261,598 A * | 4/1981 | Cornwall | ................ | F16L 5/02 |
| | | | | 52/220.8 |
| 4,445,304 A * | 5/1984 | Koda | ................ | E04F 17/08 |
| | | | | 52/220.8 |
| 5,190,320 A * | 3/1993 | Hodges | ................ | F16L 27/12751 |
| | | | | 285/338 |
| 6,101,774 A * | 8/2000 | Heil | ................ | E04G 15/061 |
| | | | | 52/220.8 |
| 7,677,604 B2 | 3/2010 | Daffin | | |
| 7,735,512 B1 * | 6/2010 | Ismert | ................ | E04G 15/061 |
| | | | | 137/362 |
| 2001/0051111 A1 * | 12/2001 | Martinez Martinez | ................ | |
| | | | | B01L 3/508 |
| | | | | 422/174 |
| 2008/0308476 A1 * | 12/2008 | Silverstein | ................ | E03F 5/06 |
| | | | | 210/163 |
| 2009/0179419 A1 * | 7/2009 | Daffin | ................ | E03C 1/12 |
| | | | | 285/31 |
| 2014/0318856 A1 * | 10/2014 | Carman | ................ | G02B 6/44775 |
| | | | | 174/655 |
| 2015/0060476 A1 * | 3/2015 | Moreau | ................ | B25H 3/00 |
| | | | | 29/428 |
| 2017/0081824 A1 * | 3/2017 | Kondas | ................ | E02D 29/10 |
| 2017/0096809 A1 * | 4/2017 | Coronado | ................ | E03F 5/041 |

* cited by examiner

METHOD OF PROVIDING A PIPE PASSAGEWAY THROUGH A CONCRETE SLAB

BACKGROUND OF THE INVENTION

Field of the Invention

The present invention generally relates to the field of plumbing. More particularly, the present invention comprises an adjustable coupling for attaching a plumbing component to a conduit.

Description of the Related Art

A plumbing pipe drain system is typically put in place or roughed in within a predetermined area in which a concrete slab is to be poured. A number of the drain pipes are projected upwardly well past what will be the top surface of the slab to be poured. After the slab has been poured and the concrete has set or hardened, the plumber returns to the site and cuts off the pipes projecting above the top surface of the slab so that the remaining upper openings of the pipes are flush with the floor. Thereafter, various plumbing fittings are secured to the upper openings of the pipes, such as toilet flanges, shower drains, and additional drain pipes.

The pipe used is plastic, such as PVC, ABS, HDPE, PB-1, PE, PE-RT or PP. The pipe and fittings most commonly used are manufactured of PVC or ABS, and the plumbing parts are readily cemented together with a solvent cement.

The pipes are often positioned close to the location of walls, or other structures. Often a projecting part of the pipe is unintentionally moved during the concrete pour with a result that after setting of the concrete, the pipe is not positioned at the desired location. For example, a toilet drain must be a specified distance from back and side walls, and a pipe which is to extend up into a vertical wall to be built on the floor slab must exit the floor slab at the proper position directly within the wall to be built. Because the disturbed or mispositioned pipes now exit the floor slab at the wrong position, the plumber must jackhammer the concrete around the pipe so that it can be replumbed and moved back to the proper location. This requires additional hard labor and is very time consuming.

An attempt to remedy this problem is disclosed in U.S. Pat. No. 7,677,604, issued on Mar. 16, 2010, for ADJUSTABLE OFFSET BUSHING TYPE COUPLING. Instead of initially roughing in the pipes whereby they vertically extend beyond the top surface of the slab to be poured, this invention calls for the use of an increaser pipe coupling which is attached to the precut upper end of the upright pipe and secured thereto so that the remaining upwardly exposed open end of the coupling thereby provides a larger diameter opening than the original drain pipe. However, it is required that the top end of this coupling must be pre-positioned to be flush with the upper level the concrete slab to be poured. Thereafter one or more intermeshed bushings are inserted into and fill the upper opening of the coupling. The bushing or bushings are provided with an eccentric vertical passageway whereby the bushing or multiple bushings may be rotated in order to position the passageway to a newly calculated position of alignment in order to receive an additional plumbing fitting at the proper location on the concrete slab.

The problem encountered with this arrangement is that first of all, the upper or top end of the increaser coupling must be pre-positioned to be flush with the intended location of the upper surface of the concrete slab to be poured. This process alone is very difficult and time consuming and next to impossible to accurately complete. In addition, the upper opening of the increaser coupling must be closed off before the pour in order to prevent concrete from entering the pipe. The bushings with eccentrically located passageways are difficult and expensive to manufacture, and must be precisely dimensioned in order to seat properly into the upper opening of the increaser fitting.

Another possible solution is the use of offset coupling members, such as an offset pipe coupling or an offset toilet flange. However, the problem with this proposal is that such offset toilet flanges by necessity include a shelf surface within the coupling which can easily cause clogging when the toilet is flushed. Also, offset pipe couplings require exposure of the coupling in areas where it is not wanted. For example if the pipe from the concrete slab is to extend upward into the center part of a wall to be built, the pipe coupling would necessarily be exposed at floor level on one side or the other of the wall to be built.

Another problem arises when installing a floor drain through a concrete slab. This is presently accomplished by installing the floor drain fitting at rough-in so that it will be flush with the upper surface of the cement slab to be poured. As previously explained, this is very difficult and time consuming to properly pre-position the floor drain, and it also difficult to make certain that poured concrete does not enter the drain.

It is a principal object of the present invention to provide a method of installing a pipe passageway through a concrete slab which eliminates all of the aforesaid disadvantages of the prior art.

SUMMARY OF THE INVENTION

The present invention provides a novel method of providing a pipe passageway through a concrete slab wherein a plastic pipe of predetermined diameter is positioned in an upright manner with an open end thereof facing upright and within a location of a concrete slab to be poured. The concrete is then poured around the pipe to a desired level leaving a portion of the pipe exposed above this level, and the concrete is permitted to solidify to form the slab. Thereafter the exposed portion of the pipe is cut off leaving an upper opening of the pipe flush with the upper surface of the slab at the aforedescribed desired level. This upper opening is then closed off with a plastic cap.

A passageway of a predetermined diameter that is smaller than the pipe diameter of the exposed pipe end in the concrete is drilled through the cap at a calculated position of alignment, which is the point of alignment where the center of the pipe extending above the cement slab was intended to be, but was misplaced because of initial miscalculation or because of being moved accidently when the concrete was poured.

Thereafter, a plastic pipe, having an outer diameter which will mate with this smaller diameter of the passageway, is inserted through the cap passageway and sealed and secured in position in the passageway of the cap. This sealing and securing will generally be accomplished by the use of a cement, such as a solvent cement.

Drilling of the cap may be performed by first marking the aforedescribed calculated position of alignment on the cap, and also marking the orientation of the cap on the upper opening of the pipe of predetermined diameter, then removing and drilling the cap and replacing the drilled cap to the upper end of the pipe in the floor. The cap is then oriented and cemented in place to its original position in the upper opening of the pipe as indicated by the orientation marks previously provided or made.

Alternatively, closing off of the upper opening of the pipe in the concrete may be performed by cementing the cap in the upper opening and then drilling the passageway of smaller diameter in the cap at the calculated position with or while the cap is cemented in place.

The cap for closing off of upper opening of the pipe embedded in the concrete is a circular plastic disk that is sized to close off this opening. The disk is provided with sufficient thickness so that it may be glued or cemented in place with the upper surface thereof flush with the concrete slab. The disk shaped cap may also be provided with a plurality of wafer thin annularly spaced ears protruding from the periphery of the disk to rest on the exposed end of the pipe embedded in the concrete slab, so that the cap may be inserted and withdrawn without falling down into the pipe. In addition, the cap may be provided with fingernail grooving on the side annular edge of the disk to assist removal of the cap from the upper opening of the pipe prior to cementing. The technique of the present invention may also be utilized for the installation of a floor drain through a concrete slab wherein a plastic pipe is positioned in an upright manner with an open end thereof facing upward and within a location of a concrete slab to be poured. The concrete slab is poured around the pipe to a desired level leaving a portion of the pipe exposed above the lever, and the concrete is permitted to solidify to form the slab. Thereafter, the exposed portion of the pipe is cut off thereby leaving an upper opening of the pipe flush with an upper surface of the slab at the desired level, and the upper opening of the pipe embedded within the concrete is simply closed off with a plastic perforated drain cap thereby instantly providing a floor drain. If desired, the plastic cap may be cemented into place in the upper opening of the pipe and multiple drain perforations may be drilled through the cap to provide the perforated drain cap.

From the foregoing, it can be readily observed that the aforementioned disadvantages experienced with the prior art are eliminated. When providing a pipe passageway through a concrete slab in accordance with the teachings of the present invention, one is not required to attempt to preposition a plumbing fitting to a required predetermined position or level. Additionally, the manufacture of complicated expensive parts is not required.

BRIEF DESCRIPTION OF THE DRAWINGS

Other objects and advantages appear hereinafter in the following description and claims. The accompanying drawings show, for the purpose of exemplification, without limiting the scope of the present invention or appended claims, certain practical examples of the present invention wherein:

DETAILED DESCRIPTION OF THE PRESENT INVENTION

Figure 1:
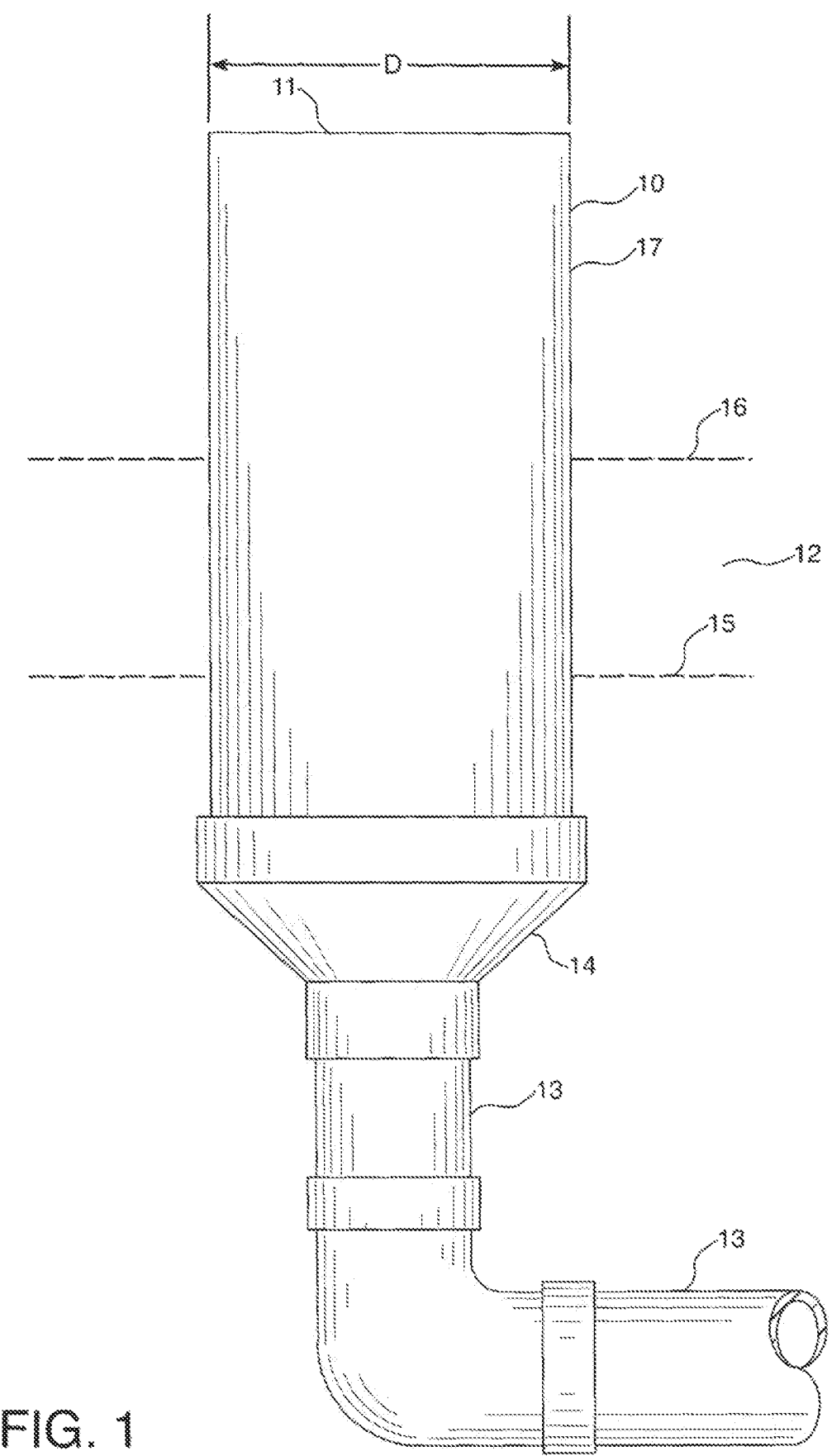
FIG. 1 is a view in side elevation illustrating the first step of the method of the present invention wherein an enlarged pipe of predetermined diameter is positioned in an upright position within a location of a concrete slab to be poured.

Referring to FIG. 1, this figure illustrates the initial rough-in plumbing for providing a pipe passageway through a concrete slab in accordance with the teachings of the method of the present invention. A plastic pipe 10 of a predetermined diameter D is held or retained in an upright position as illustrated with an open end 11 facing upward and within a location 12 of a concrete slab to be poured. In this instance, for example, we will designate the inside diameter of pipe 10 to be six inches and the pipe 10 to be manufactured of PVC or ABS.

Pipe 10 is supported and held in position by underlying rough-in plumbing consisting of the four inch pipeline 13 which is of the same or similar plastic, and a six inch to four inch reducer of expander 14. All of these plastic plumbing fixtures or elements are cemented together with a solvent cement. Pipe 13 is supported in the position illustrated by surrounding earth and/or gravel (not shown).

The important feature to recognize is that plastic pipe 10 of predetermined diameter is and must have an internal diameter which is larger than the underlying drain pipe 13.

Figure 4:
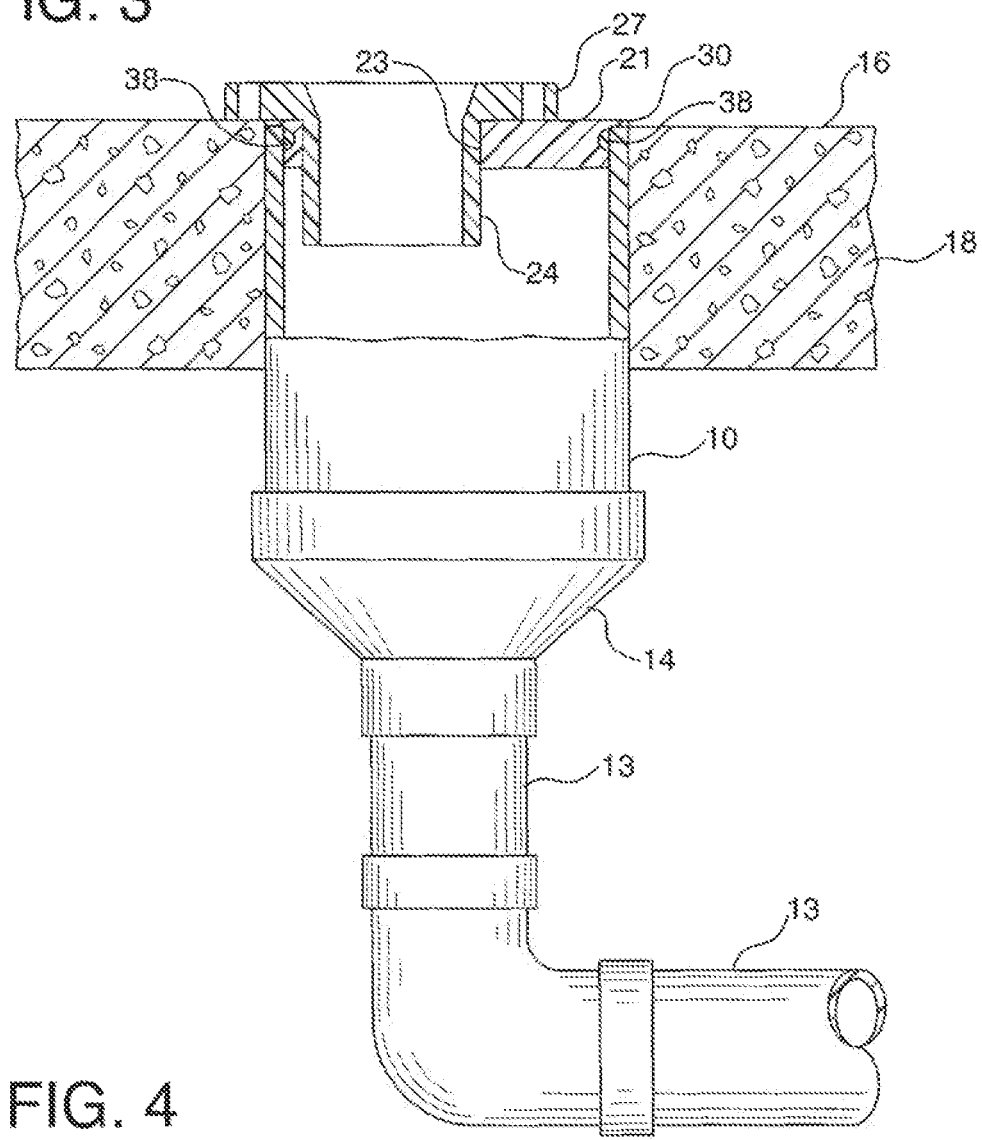
FIG. 4 is a view in side elevation with upper portions thereof shown in mid cross section illustrating the assembly shown in FIG. 3.

Concrete is then poured around pipe 10 at location 12 on top of the underlying earth or gravel surface 15 to a desired level 16 leaving a portion 17 of pipe 10 exposed above level 16. The concrete is permitted to solidify in order to form concrete slab 18 such as illustrated in FIG. 4.

Figure 2:
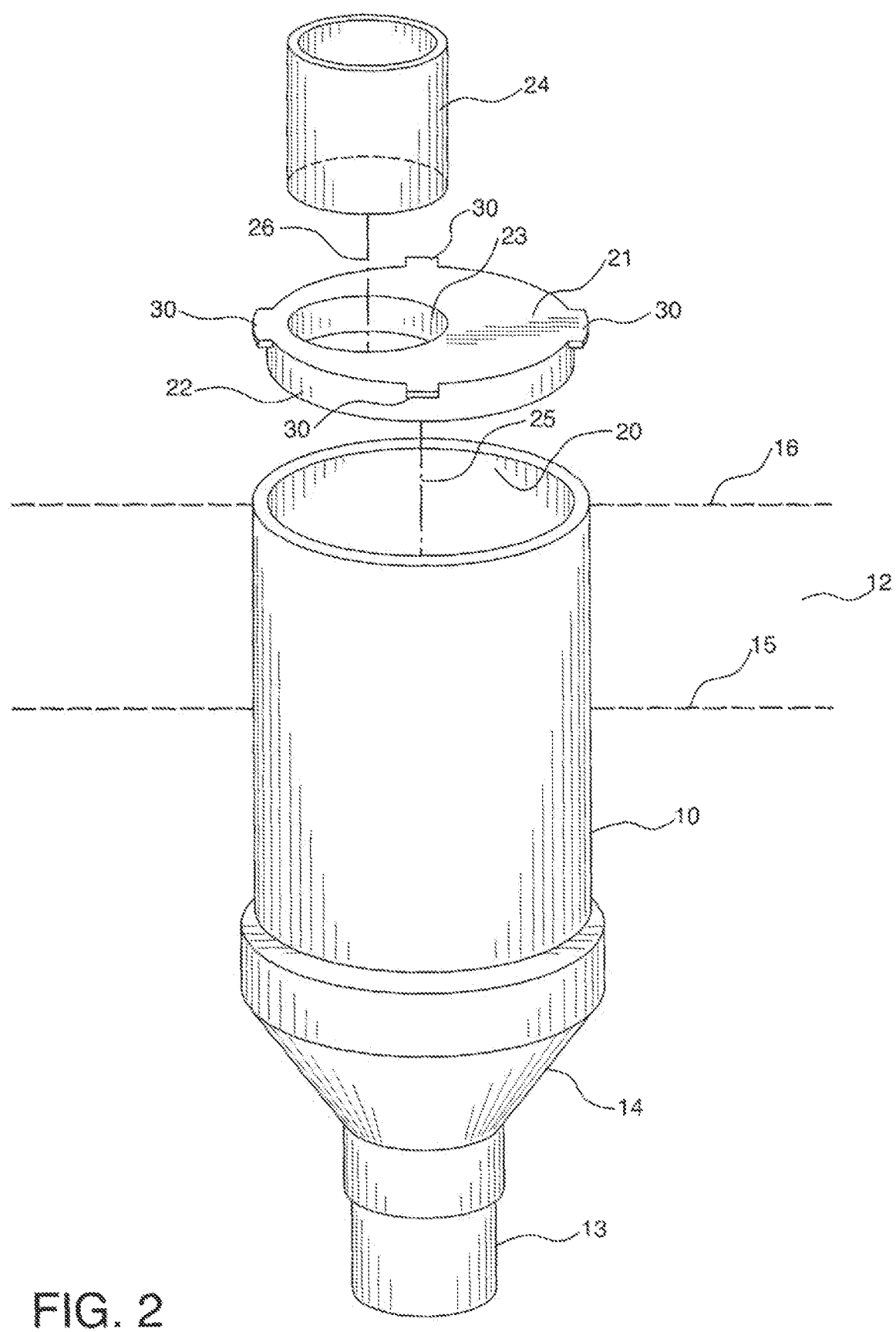
FIG. 2 is an isometric exploded view in side elevation of the structure shown in FIG. 1 after the upright pipe of enlarged diameter has been cut down to the desired level flush with the slab of hardened concrete, and further illustrating the cap for closing off the upper opening of the pipe and the pipe of smaller diameter to be inserted within a passageway through the cap at a newly calculated position of proper alignment.

After the concrete 18 has solidified, pipe 10 of a larger predetermined diameter is cut off at level 16 thereby leaving an upper opening 20 of pipe 10 as indicated in FIG. 2 such that upper opening 20 is flush with an upper surface of the cement slab 18 at the desired level 16.

The upper portion of pipe 17 may be cut off at level 16 by any conventional cutting tool, such as a reciprocating saw with a long flexible blade, and oscillating saw or an angle grinder.

A cap 21 is then inserted into upper opening 20 of pipe 10 to close off upper opening 20. Cap 21 consists of a plastic circular disk with an annular edge 22 having a thickness or depth which is a sufficient depth to provide an adequate contact gluing area between the periphery of cap 21 and the interior of pipe 10 at upper opening 20. For example, the depth of edge 22 of cap 21 might typically be between one to two inches.

Thereafter, a passageway 23 in cap 21 of a predetermined diameter, which is smaller than the internal diameter of pipe 10, is drilled through cap 21 at a calculated position of alignment where the center of pipe 10 should have been originally positioned. Then a plastic pipe 24 (FIG. 2) having an outside diameter which will mate with the smaller diameter of passageway 23, is inserted through cap passageway 23 and is there sealed and secured in position in passageway 23 of cap 21, such as by a solvent cement.

This figure illustrates that the original position of the center line of pipe 13 is located at center line 25. However, after slab 18 was poured and hardened it became clear that center line 25 was not properly positioned as required and in order to provide the required repositioning to a calculated position of alignment indicated by center line 26, passageway 23 had to be drilled through cap 21 at a newly calculated position of alignment as indicated by center line 26.

Figure 3:
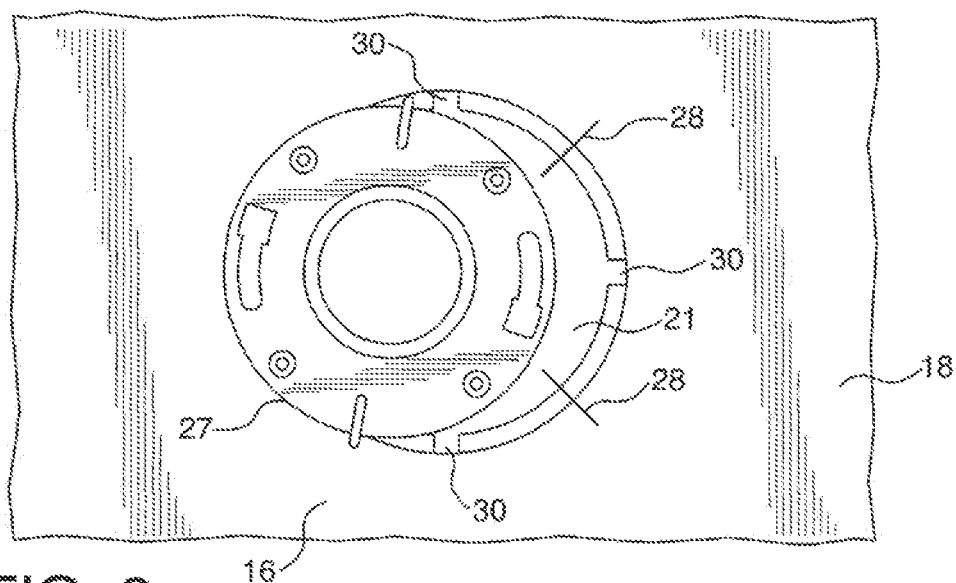
FIG. 3 is a top or plan view of a realigned toilet flange assembled in accordance with the method of the present invention.

With further reference to FIGS. 3 and 4, the pipe 24 of smaller diameter is in fact illustrated as an integral part of a plastic toilet flange 27. As previously explained, the center of toilet flange 11 by code must be spaced a specific distance from adjacent walls or other objects. The initial positioning of the center line 25 of pipe 10 was unfortunately misaligned and positioned in the wrong place. This could be due to movement of pipe 10 which is caused when the slab 18 was poured or when gravel under the slab was laid, or possibly the initial rough-in plumbing of drain pipe 13 was measured from a cement block wall, the outer surface of which was thickened or changed due to the later construction or addition of a 2 by 4 wall.

Drilling of passageway 23 through cap 21 may be performed with cap 21 removed from the upper opening 20 of pipe 10, or may be performed, such as by a hole saw, with the cap 21 cemented into place in the opening 20 of pipe 10 as indicated in FIG. 4.

If the passageway 23 is to be drilled with the cap 21 removed from upper opening 20, first a mark (not shown) is made on the upper surface of cap 21 at the newly calculated position of alignment as previously indicated by center line 26 of pipe 24. In addition, the orientation of cap 21 is also marked with orientation markings 28 so that when cap 21 is returned to upper opening 20, cap 21 may be properly reoriented to the proper position to make certain that the center line 26 of passageway 23 is properly aligned to its calculated position of alignment.

As an alternative, cap 21 may be glued in place as illustrated in FIG. 4, and the drilling of passageway 23 accomplished with cap 21 cemented in place. This may accomplished, for example with a hole saw which has a tendency to grasp and retain the drilled out center portion of the plastic being drilled for the passageway 23 so that it does not accidently fall into the drain.

The inside diameter of pipe 10 may be varied inside depending upon the particular application. For example, the inside diameter of pipe 10 could be anywhere from four to twelve inches, remembering that the important thing is that this diameter must be larger than the internal diameter of drain pipe 13 to thereby provide an adequately large area within which to relocate attachment of a drain pipe 24 to a newly recalculated position of alignment. The smaller internal diameter of the drain pipe 13 would typically be three or four inches. In a most typical installation, drain pipe 13 would have an internal diameter of four inches, and pipe 10 of larger diameter would have an internal diameter of six or eight inches.

Plastic cap 21, as previously explained, is sized to close off upper opening 20 of pipe 10 and the circular plastic disk that makes up cap 21 is provided with a plurality of wafer thin annularly spaced break-off ears 30 protruding from the periphery of the disk body forming cap 21. These ears 30 thus rest on an exposed end of pipe 10 in order to hold cap 21 in place so that it can be readily removed and drilled prior to cementing. When the plumber is ready to permanently cement cap 21 in place in opening 20, the cement is applied to the perimeter of edge 22 of cap 21, and also to the inside of pipe 10 at opening 20. When the disk of cap 21 is then glued into position within opening 20, ears 30 are broken away either manually by the plumber or by the force of inserting cap 22 down into opening 20.

Cap 21 is also be provided with fingernail grooving 38 on the side annular edge 22 of the disk forming cap 21 to assist in removal of the cap from the upper opening 20 prior to cementing.

Figure 5:
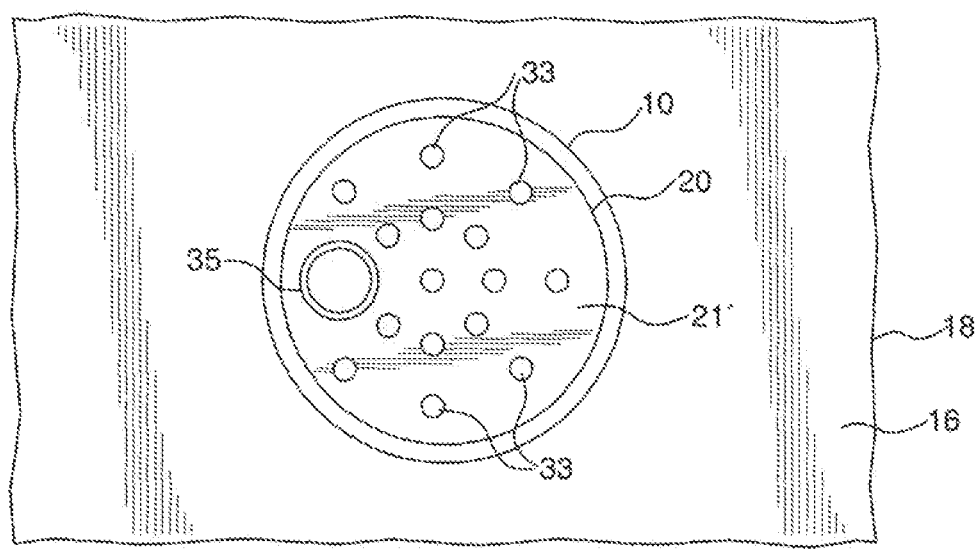
FIG. 5 is a plan view of a floor drain constructed in accordance with the techniques of the present invention.
Figure 6:
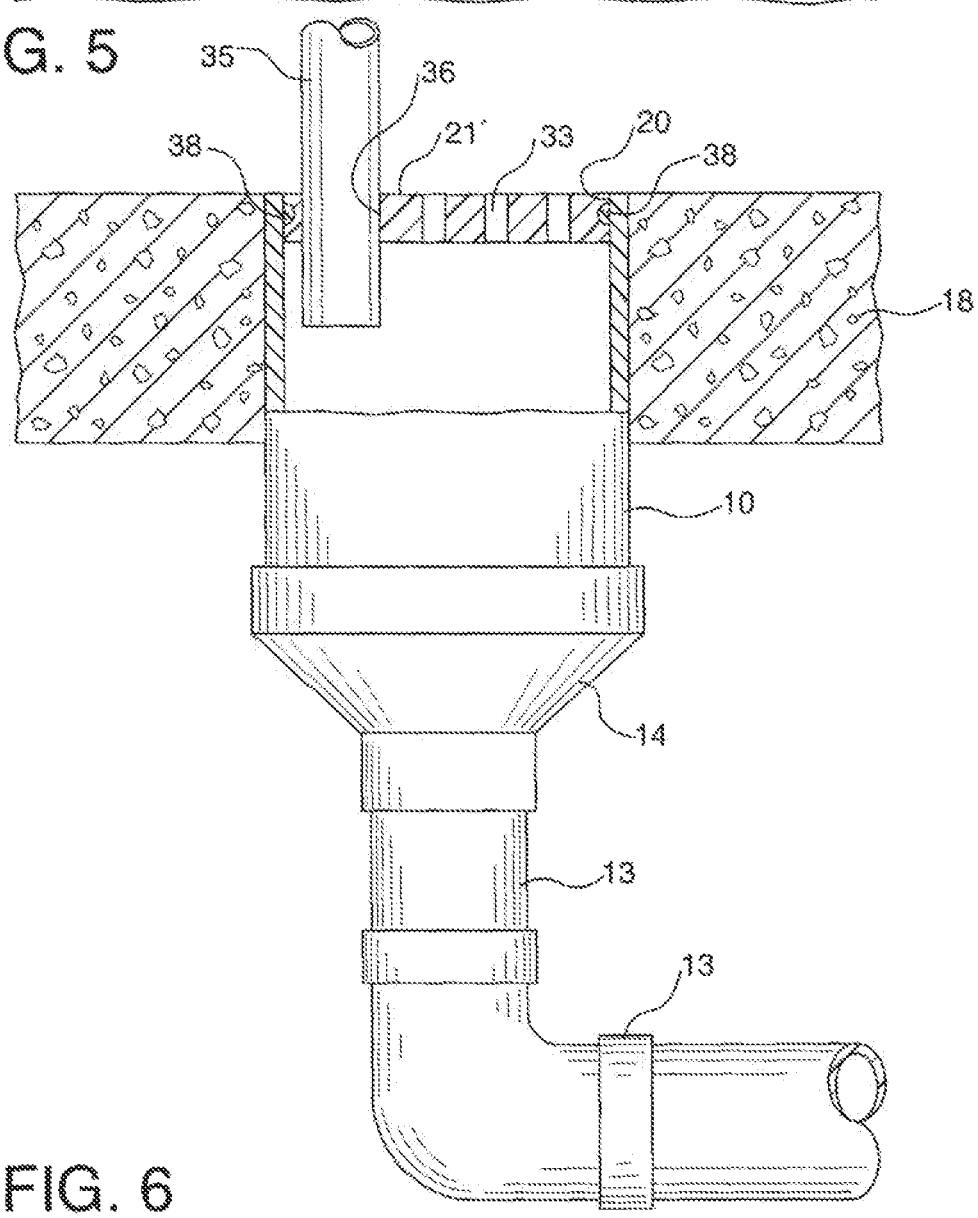
FIG. 6 is a view in side elevation with upper sections shown in mid cross section illustrating additional details of the floor drain assembly shown in FIG. 5.

Turning next to FIGS. 5 and 6, the method of the present invention is illustrated for the installation of a floor drain within a cement slab 18. In this embodiment, it is not necessary to preposition a floor drain fixture at a required position of elevation prior to pouring slab 18. Instead, as was previously explained, pipe 10 is retained at rough-in and in an upright position as illustrated with the open end thereof facing upward and within a location of a concrete slab 18 to be poured. The concrete slab 18 is poured to a desired level, and this will provide adequate draining slope to the drain pipe combination, with a portion 17 of pipe 10 exposed above the level 16. The concrete is permitted to solidify to form slabs 18 and thereafter pipe 10 is cut off so that the exposed portion 17 of the pipe is removed leaving an upward opening 20 thereof flush with the upper surface 16 of the slab 18. Thereafter, the upper opening 20 of pipe 10 is closed off with a plastic perforated drain cap 21', thereby providing a completed floor drain.

The plastic drain cap 21' may be preformed, or as an alternative, drain cap 21' may be provided as a solid disk that is cemented in place in upper opening 20 of pipe 10. After being cemented in place, then the solid disk may be drilled to provide multiple drain perforations 33.

FIGS. 5 and 6 further illustrate an additional advantage of the method of the present invention wherein a small drain pipe 36 may be inserted through the drain cap 21 by drilling a passageway 36 through the drain cap 21' and then inserting plastic pipe 35 through the passageway 36 and cementing drain pipe 35 in place in passageway 36. This provides a convenient and clean way of, for example, installing a condensate line to the sewer from an air conditioning unit.

I claim:

1. A method of providing a pipe passageway through a concrete slab, the method comprising:

Positioning a first plastic pipe of predetermined diameter in an upright position with an open end thereof facing upward and within a location of a concrete slab to be poured;

After the positioning step, pouring concrete around said first pipe to a desired level leaving a portion of said first pipe exposed above said level and permitting the concrete to solidify to form the slab;

After the pouring step, cutting off said exposed portion of said first pipe thereby leaving an upper opening thereof flush with an upper surface of said slab at said desired level;

After the cutting off step, closing off said upper opening of said first pipe with a plastic cap;

After the closing off step, drilling a passageway of a predetermined diameter which is smaller than said first pipe diameter through said cap at a calculated position of alignment; and After the drilling step, inserting a second plastic pipe, having an outside diameter which will mate with said smaller diameter of said passageway, through said cap passageway and sealing and securing said second pipe of smaller diameter in position in said passageway of said cap with cement.

2. The method of claim 1 wherein said second pipe of smaller diameter is an integral part of a toilet flange.

3. The method of claim 1, wherein the step of drilling is performed by marking said calculated position of alignment on said cap, marking the orientation of said cap on said upper opening of said first pipe of predetermined diameter, removing and drilling said cap, replacing said drilled cap to said upper opening of said first pipe, and orienting and cementing said cap to its original position in said upper opening as indicated by said orientation marking.

4. The method of claim 1, wherein the step of closing off said upper opening is performed by cementing said cap in said upper opening, and the step of drilling is performed by marking said calculated position on said cap and drilling said passageway with said cemented cap in place.

5. The method of claim 1, wherein said first pipe of a predetermined diameter has an inside diameter of 6 or 8 inches and said smaller diameter is 3 or 4 inches.

6. The method of claim 4, wherein said second pipe of smaller diameter is an integral part of a toilet flange.

7. The method of claim 1, wherein said cap is a circular plastic disk sized to close off said upper opening and provided with a plurality of wafer thin annularly spaced ears protruding from the periphery of said disk to rest on an exposed end of said first pipe of predetermined diameter.

8. The method of claim 6, including the step of removing said ears prior to or while cementing said cap into said upper opening of said first pipe whereby an upper surface of said cap is flush with said upper opening when cemented to said upper opening.

9. The method of claim 7, wherein said disk is provided with fingernail grooving on a side annular edge of said disk to assist removal of said cap from said upper opening prior to cementing.

* * * * *